Dec. 1, 1931.  N. GOODWIN ET AL  1,834,305

RETORT AND IMPROVED VALVE CONSTRUCTION THEREFOR

Filed Aug. 6, 1929  2 Sheets-Sheet 1

INVENTORS:
Norris Goodwin,
Norris M. Mumper,
By Fred A. Davis

ATTORNEY.

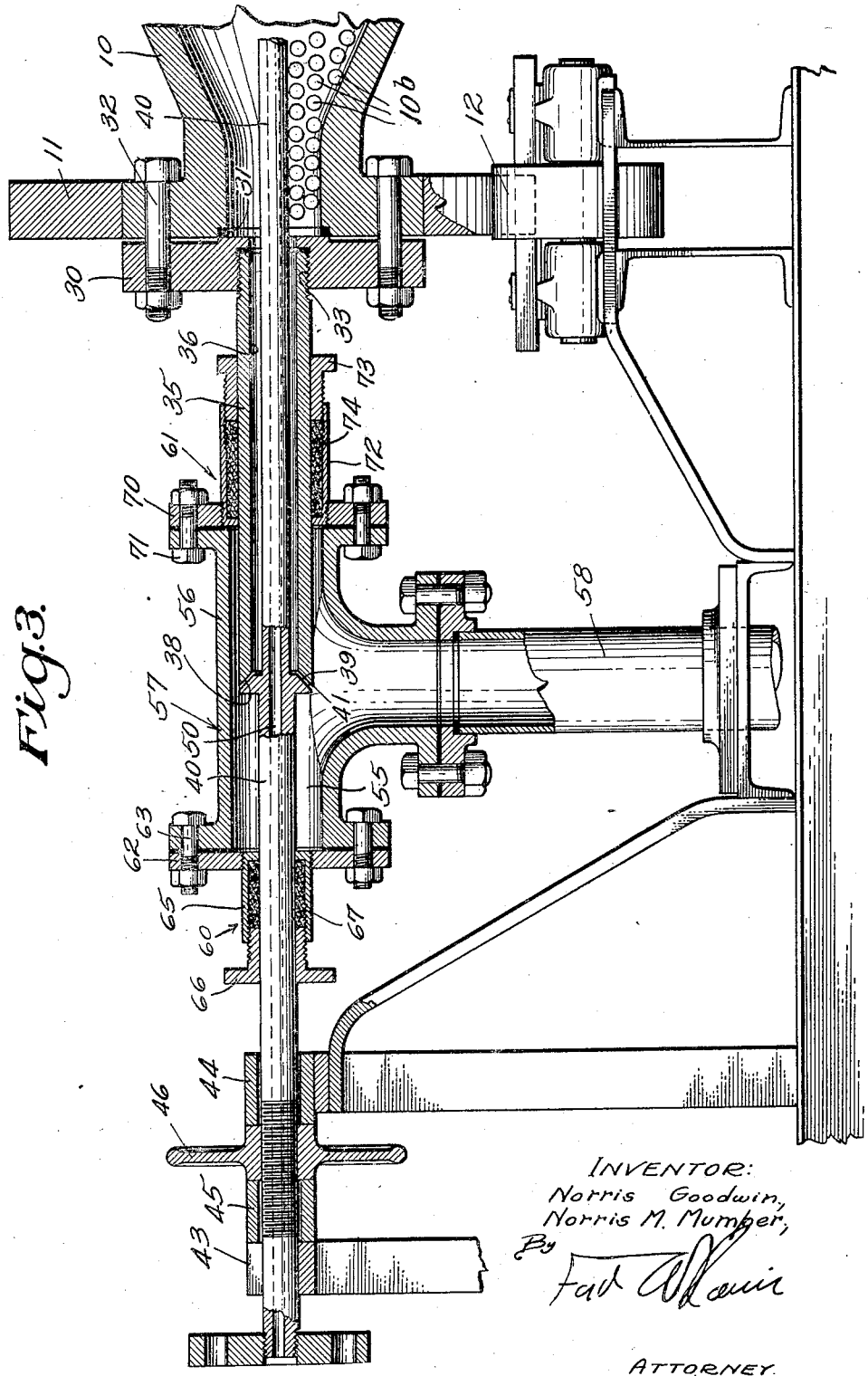

Patented Dec. 1, 1931

1,834,305

UNITED STATES PATENT OFFICE

NORRIS GOODWIN AND NORRIS M. MUMPER, OF LOS ANGELES, CALIFORNIA, ASSIGNORS TO INDUSTRIAL PROCESS COMPANY, OF LOS ANGELES, CALIFORNIA, A CORPORATION OF CALIFORNIA

RETORT AND IMPROVED VALVE CONSTRUCTION THEREFOR

Application filed August 6, 1928. Serial No. 297,875.

Our invention relates to sealing devices for sealing a rotatable member and a stationary member relative to each other.

An important object of our invention is to provide a novel form of sealing device for sealing such a rotatable member and stationary member.

We have found it difficult to maintain a tight seal between a rotating and a stationary member without frequent adjustment and replacement of the packing device forming this seal. This is especially true when packing against a large difference in pressure, and in the presence of high temperatures. We have found it advantageous to reduce such a high pressure to a lower pressure so that it will be necessary to pack only against this lower pressure instead of against the high pressure.

It is an object of our invention to provide a novel method of sealing a stationary member relative to a rotatable member against a large difference in pressure by first reducing this pressure and packing the stationary and rotatable members against this lower pressure.

It is a further object of our invention to provide a means of varying the clearance between a rotating and a stationary member in such a way as to maintain any predetermined pressure in the system, and simultaneously provide a means for taking up any excess clearance due to wear caused by attrition or abrasion on the faces of the rotating and stationary members forming such point of clearance.

Our invention finds one utility in the cracking of petroleum. In this art, it is desirable to provide a rotating retort containing a plurality of metallic bodies, the oil or other fluid to be treated being introduced into the retort and cracked by the application of heat to the external walls of the retort during the rotation thereof. The fluid products given off during this cracking process must be conducted from the rotating retort, preferably parallel to the axis of rotation thereof. In conducting the fluids from the retort, it is necessary to suitably pack a rotating and a stationary member. It is further desirable to reduce the pressure on the products leaving such retort thus causing some cooling due to expansion.

The pressures inside the retort are sometimes as high as 1,500 pounds per square inch and the temperatures of the products therein sometimes reach 900° F. We have found it advantageous to place this packing a short distance from the retort so as to receive a minimum amount of heat therefrom. We have furthermore found it advantageous to throttle the fluids leaving the retort and pack the rotating and stationary members against this lower pressure rather than the high pressure in the retort. This throttling action we accomplish by providing valve faces on the rotating and stationary members, these faces being separated by an adjustable space through which the fluid products must pass leaving the retort, such products may be gases, liquids, or suspensions, there always being sufficient leakage by the valve to maintain lubrication.

Our invention finds another utility in the hydrogenation of vegetable oils or other treatment of fluid material under relatively high temperature and low pressure.

It is an object of our invention to provide an adjustable device for throttling the flow of fluid products from a retort.

Further objects of our invention lie in the particular construction of the stationary and rotatable members, together with the construction of the retort.

A further object of our invention is to provide a retort adapted to both receive a fluid to be treated and expel fluid products, holding gas in solution and solids in suspension, from the same end of the retort.

Further objects and advantages of our invention will be made evident hereinafter.

Referring to the drawings,

Fig. 3 is a sectional view of the left end of Fig. 1.

Figure 1:
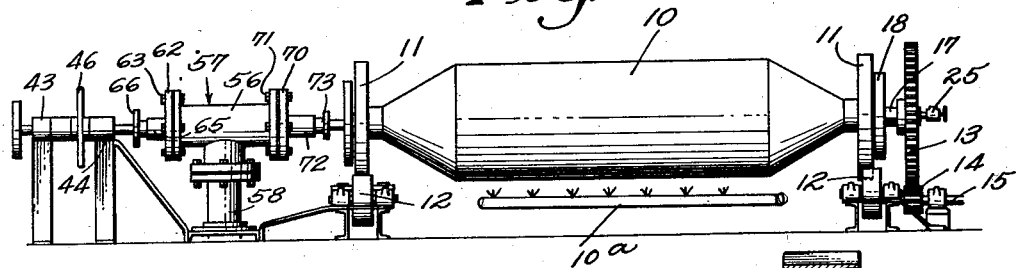
Fig. 1 is a utility view illustrating our apparatus in elevation.

One method of cracking fluids, such as crude oil and other hydrocarbon oils, utilizes a rotatable retort such as is designated by the numeral 10 of Fig. 1. This retort has bearing rings 11 on the opposite ends thereof which rest on two or more rollers 12 situated at each end of the retort. The retort 10 is rotated by means of a gear 13 having teeth which are meshed with a pinion 14, the pinion being suitably mounted on a shaft 15 and driven by a prime mover, not shown. The gear 13 is connected to the retort 10 in a manner best shown in Fig. 2, this connection being accomplished through a stub-shaft 17 keyed to the gear 13 and to a collar 18 which is clamped to the bearing ring 11 by bolts 19. The collar 18 bears against a shoulder 20 formed on the inner end of the stub-shaft 17 and forces this inner end against a packer 21 positioned in the inner end of a cavity 22 in which the inner end of the stub-shaft 17 fits. The stub-shaft 17 has a chamber 23 therein which communicates with a passage 24 normally closed by a valve 25.

The other end of the retort 10 is best illustrated in Fig. 3 and comprises a collar 30 suitably clamped against a packer 31 as by bolts 32. Threaded into an opening 33 of the collar 30 and concentric with the longitudinal axis of the retort 10, is a rotatable outlet member 35 having an opening 36 therethrough.

The end of the rotatable outlet member 35 has a frusto-conical valve face 38 formed thereon. Positioned adjacent the face 38 is a valve face 39 formed on a stationary inlet member 40 of our invention, the faces 38 and 39 being separated by a small space 41. The stationary inlet member 40 is supported in a pair of standards 43 and 44 which slidably journal this member. Positioned between these standards is a collar 45 surrounding the member 40, this collar being adapted to position a hand-wheel 46 between itself and the standard 44. The hand-wheel 46 is threaded on the stationary member 40 and provides an adjusting means for adjusting the axial position of this member so as to vary the width of the space 41.

Figure 2:
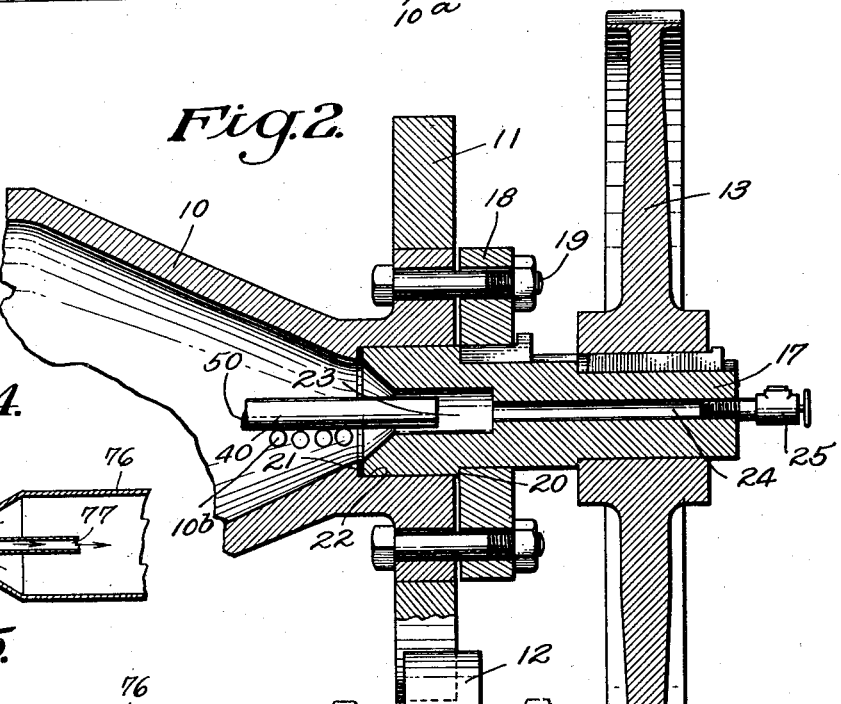
Fig. 2 is a sectional view of the right end of Fig. 1.

The stationary inlet member 40 extends through the opening 36 in the rotatable outlet member 35 and completely through the retort 10, terminating inside the chamber 23, as best illustrated in Fig. 2. A passage 50 is formed through this stationary member throughout its length and is adapted to pass a fluid to be treated therethrough and into the retort 10, this fluid passing through the entire length of the stationary member before being discharged into the retort. Heat is applied by means of the burner 10a to the external surface of the retort 10 after this retort has been at least partially filled with a number of iron balls or similar substances. As the fluid to be treated passes over these iron balls, the heat causes fluid products to be driven off, these products passing through the annular space between the rotatable and stationary members 35 and 40, and through the space 41, discharging into an intermediate chamber 55 formed by walls 56 of an outlet structure 57.

The retort 10 is normally filled with iron, or steel, balls 10b to about the bottom of pipe 40 and contains oil to about the center line of pipe 40 and in this manner fluid products, both liquid, solid, and gaseous, continually pass out through the space 41 when operating; all as fully described in the copending applications of Goodwin and Poindexter, Serial No. 195,308, filed May 31, 1927, and Serial No. 321,842, filed November 26, 1928.

A discharge pipe 58 is in communication with the chamber 55 and conducts the fluid products to a suitable condenser where they are condensed. This condenser, together with the width of the space 41, determines the primary pressure in the intermediate chamber 55, this pressure being substantially lower than the secondary pressure inside the retort 10 due to the throttling action that takes place in the space 41. The amount of throttling may be varied by turning the hand-wheel 46, but it should be clear that in all instances the intermediate chamber 55 is at a lower pressure than the interior of the retort 10.

The stationary and rotatable members 40 and 35 are respectively packed relative to the walls 56 by packing means indicated by the numerals 60 and 61. The packing means 60 has a flange 62 bolted to the walls 56 by bolts 63, and is threaded to receive a packing-retaining member 65. A gland 66 surrounds the stationary member 40 and is threadedly received by the packing-retaining member 65 in a manner to compress a packing 67 around the stationary member 40. Inasmuch as there is no relative movement between the member 40 and the walls 56, unless the handle 46 is turned, this packing will last indefinitely.

The packing means 61 is provided with a flange 70 held against the walls 56 by bolts 71, this flange having a threaded opening adapted to receive a packing-retaining member 72 similar to the member 65 except that it is somewhat larger to accommodate the rotatable member 35.

A gland 73 is threaded into the packing-retaining member 72 and compresses a packing 74 against the rotatable member 35, thus sealing these two members. It should be understood that the packing means 60 and 61 are required to pack only against the difference in pressure between the interior of the intermediate chamber 55 and atmospheric pressure. This difference in pressure is substantially lower than the difference in pressure which exists between the interior of the retort 10 and the atmosphere, and we have found that the packing 67 and 74 will last much longer with the arrangement shown than if a single packing means were to be placed at one end of the retort to pack a stationary member for supplying fluid to or from the retort relative to a member rotating with the retort.

Furthermore, the packing means 61 is positioned a distance from the walls of the retort, so that the rotatable outlet member 35 may be air-cooled. The packing 74 is thus not subjected to the high temperatures of the walls of the retort. By keeping the packing cool a large economy is effected inasmuch as this packing may be of a cheaper grade and yet have a much longer life than would otherwise be the case.

It should be understood that we are not limited to the use of our novel valve construction packing arrangement in the particular utility illustrated. This valve construction packing arrangement has utilities in various other fields than the one shown.

Furthermore, it is not necessary that the pipe 58 be connected to a condenser, but may be connected to any device which will maintain a pressure in the intermediate chamber 55 which is lower than the pressure in the retort 10. In fact, the pipe 58 may communicate with the atmosphere if desired, thus placing the chamber 55 at a pressure substantially equal to atmospheric.

The throttling space 41 is important to our invention, this space acting as an outlet for the fluid products discharged from the retort 10 and also serving to throttle these fluid products to the pressure of the chamber 36. We have found that the passage of the fluid to be treated through the passage 50 is advantageous inasmuch as this fluid is highly heated in this passage before being discharged into the interior of the retort 10.

Obviously a hydraulic regulation or any other suitable means may be substituted for the hand-wheel 46, as shown in the drawings, the essential requirement being a means of communicating a longitudinal thrust to the inlet member 40.

Figure 4:
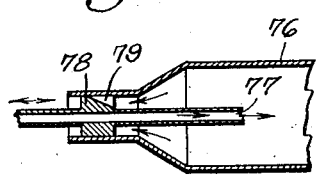
Figs. 4, 5 and 6 are fragmental longitudinal sectional views illustrating alternative constructions of the sealing means for the rotating retort.
Figure 5:
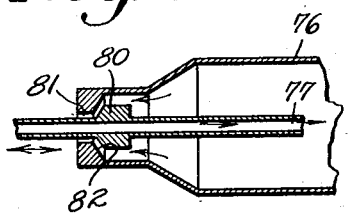
Figure 6:
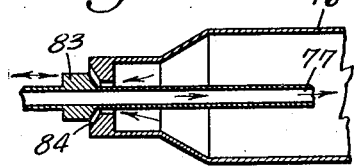

Figs. 4, 5 and 6 illustrate alternative sealing means for rotating retorts. In these forms the retorts are numbered 76 and the inlet pipes numbered 77. In Fig. 4, the inlet line carries a plug 78, ground to fit the narrowed neck of the retort. On the end of the plug 78 is a tapered groove 79, which exposes an opening graduating in size as the inlet pipe 77 is moved back and forth.

In Fig. 5, the plug 80 is somewhat larger than the opening 81 in the retort and engages a beveled seat 82 at the inner side of the opening 81. Here the pressure within the retort is constantly tending to hold the plug 80 in a closed position. A counter thrust on the inlet pipe 77 serves for opening and regulation.

In Fig. 6, the construction is identical with Fig. 5 except that the plug 83 engages a beveled seat 84 on the outside of the neck of the retort and pressure within the retort is constantly tending to open the closure.

In the appended claims the term "fluid" should be given a broad interpretation, this term being used to include vapors and other fluid products given off in the retort 10.

We claim as our invention:

1. In an apparatus for cracking hydrocarbons, the combination of: a rotatable retort having an opening in the axis of rotation thereof; a reciprocable pipe passing through said opening and adapted for supplying material to the interior of said retort; and means on the exterior of said pipe adapted to form a variable closure for the opening in said retort sufficient to maintain a higher pressure within said retort than exists on the outside of the point of closure when material is fed into said retort through said reciprocable pipe.

2. In an apparatus for cracking hydrocarbons, the combination of: a rotatable retort having an opening in the axis of rotation thereof; a reciprocable pipe passing through said opening and adapted for supplying material to the interior of said retort; means on the exterior of said pipe adapted to form a variable closure for the opening in said retort sufficient to maintain a higher pressure within said retort than exists on the outside of the point of closure when material is fed into said retort through said reciprocable pipe; and means for supplying heat to said retort.

3. In an apparatus for cracking hydrocarbons, the combination of: a rotatable retort having an opening in the axis of rotation thereof; a reciprocable pipe passing through said opening and adapted for supplying material to the interior of said retort; means on the exterior of said pipe adapted to form a variable closure for the opening in said retort sufficient to maintain a higher pressure within said retort than exists on the outside of the point of closure when material is fed into said retort through said reciprocable pipe; and means for varying the degree of closure.

4. In an apparatus for cracking hydrocarbons, the combination of: a rotatable retort having an opening in the axis of rotation thereof; a reciprocable pipe passing through said opening and adapted for supplying material to the interior of said retort; means on the exterior of said pipe adapted to form a variable closure for the opening in said retort sufficient to maintain a higher pressure within said retort than exists on the outside of the point of closure when material is fed into said retort through said reciprocable pipe; and means for confining the materials which escape from the closure under lower pressures than exist in the retort.

5. In an apparatus for cracking hydrocarbons, the combination of: a rotatable retort having an opening in the axis of rotation thereof; a reciprocable pipe passing through said opening and adapted for supplying material to the interior of said retort; means on the exterior of said pipe adapted to form a variable closure for the opening in said retort sufficient to maintain a higher pressure within the body of said retort than exists exteriorly of the point of closure when material is fed into said retort through said reciprocable pipe; means for supplying heat to said retort; means for varying the degree of closure; and means for confining the materials which escape from the closure under lower pressures than exist in the retort.

6. In an apparatus for treating fluid materials under high pressure, the combination of: a hollow rotating member; a hollow reciprocable member; an inter-communicating channel between said rotating and reciprocable members; a valve forming a closure between said rotating and stationary members; and means for varying the position of said valve.

7. In an apparatus for treating fluid materials under high pressure, the combination of: a rotatable retort having an axial opening; a reciprocable pipe passing through said opening and adapted to supply material to the interior of said retort; means on the exterior of said pipe adapted to form a variable closure for the opening in said retort sufficient to maintain a higher pressure within said retort than the pressure on the outside of said closure when material is fed into said retort through said reciprocable pipe; means for supplying heat to said retort; and means for regulating the flow of materials carrying suspended solids.

In testimony whereof, we have hereunto set our hands at Los Angeles, California, this 26th day of July, 1928.

NORRIS GOODWIN.
NORRIS M. MUMPER.